United States Patent
Ooya et al.

(10) Patent No.: US 7,187,692 B1
(45) Date of Patent: Mar. 6, 2007

(54) INFORMATION COMMUNICATION SYSTEM, NONCONTACT IC CARD, AND IC CHIP

(75) Inventors: Mitsuyoshi Ooya, Takatsuki (JP); Shinichi Tokumitsu, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1024 days.

(21) Appl. No.: 10/111,985

(22) PCT Filed: Nov. 2, 2000

(86) PCT No.: PCT/JP00/07721

§ 371 (c)(1), (2), (4) Date: Jul. 30, 2002

(87) PCT Pub. No.: WO01/33725

PCT Pub. Date: May 10, 2001

(30) Foreign Application Priority Data

Nov. 4, 1999 (JP) ................................. 11-313422

(51) Int. Cl.
*H04L 12/43* (2006.01)

(52) U.S. Cl. ............... 370/458; 370/459; 370/461; 370/462; 370/442; 370/443; 370/445; 370/447

(58) Field of Classification Search ................ 370/458, 370/459, 460, 461, 462, 442, 443, 445, 447
See application file for complete search history.

(56) References Cited

U.S. PATENT DOCUMENTS

| 4,471,345 | A |  | 9/1984 | Barrett, Jr. | |
|---|---|---|---|---|---|
| 4,750,171 | A | * | 6/1988 | Kedar et al. | 370/445 |
| 5,119,373 | A | * | 6/1992 | Fredricsson et al. | 370/458 |
| 5,481,541 | A | * | 1/1996 | Gareh et al. | 370/462 |
| 5,680,459 | A |  | 10/1997 | Hook et al. | |
| 5,698,837 | A | * | 12/1997 | Furuta | 235/492 |
| 5,777,561 | A |  | 7/1998 | Chieu et al. | |
| RE36,353 | E | * | 10/1999 | Yang et al. | 370/448 |
| 6,388,562 | B1 | * | 5/2002 | Takiguchi et al. | 340/10.2 |
| 6,456,191 | B1 | * | 9/2002 | Federman | 340/10.2 |
| 6,954,438 | B2 | * | 10/2005 | Morley et al. | 370/278 |

FOREIGN PATENT DOCUMENTS

DE     195 26 353     1/1997

(Continued)

OTHER PUBLICATIONS

Phillips Semiconductors: "Short Form Specification: SmartMX" Integrated Circuits: P5CTO72 Secure Triple Interface Smart Card Controller, Online! No. Rev. 1.0, May 23, 2003.

*Primary Examiner*—Huy D. Vu
*Assistant Examiner*—Chuong Ho (57) ABSTRACT

An information communication system which includes a master station and a plurality of slave stations and enables reduction of the processing time of the whole system. When transmitting a response signal to the master station, each slave station generates not only a time slot number but also a time delay number. If a slave station detects a transmission of a response signal by another slave station having been performed prior to the time of the determined time delay number within the same time slot, the slave station does not transmit the response signal.

10 Claims, 7 Drawing Sheets

FOREIGN PATENT DOCUMENTS

| | | |
|---|---|---|
| EP | 1 017 005 | 7/2000 |
| JP | 63-9249 | 1/1988 |
| JP | 5-300166 | 11/1993 |
| JP | 7-143142 | 6/1995 |
| JP | 8-69583 | 3/1996 |
| JP | 8-223081 | 8/1996 |
| JP | 11-003407 | 1/1999 |
| JP | 11-134468 | 5/1999 |

* cited by examiner

FIG.5

INFORMATION COMMUNICATION SYSTEM, NONCONTACT IC CARD, AND IC CHIP

TECHNICAL FIELD

The present invention relates to an information communication system for conducting communications between a master station and a plurality of slave stations, a contactless IC card used as a slave station in the information communication system, and an IC chip.

BACKGROUND ART

Recently, an information communication system has been developed in which communications are conducted in a contactless manner between a master station, or a reader/writer and slave stations, or IC cards. The practical use of this communication system is now under study in various fields. For example, if the system was applied to a ticket gate of a railroad station, IC cards would be used as commuter tickets and a reader/writer would be set up in an automatic ticket gate, whereby the opening and closing of the gate is controlled in accordance with the information communication conducted between the IC cards and the reader/writer. This eliminates users having to take commuter tickets out of card cases. As such, the system is practically useful and it can be expected that the system will be applied in wide range of fields in the future.

In the above information communication system, there may be a case where, for example, a user carries a plurality of commuter tickets (slave stations), they respond to a request from the master station by transmitting a plurality of response signals simultaneously. The system, however, has a problem that the master station cannot appropriately recognize overlapping response signals from the slave stations. This problem is especially serious when the master station attempts, at the start of the communication, to acquire the identifiers (hereafter abbreviated as "IDs") of the slave stations. Once having acquired the IDs of the slave stations, the master station can separately transmit or receive information to/from the slave stations by adding the IDs to signals.

As one method for avoiding the overlapping of response signals from slave stations, use of time slots is currently studied. In this method, a time period during which the slave stations are allowed to transmit their response signals is divided into a plurality of time slots having a certain time length. Each slave station then selects one time slot at random and transmits a response signal during the selected time slot.

Figure 1:
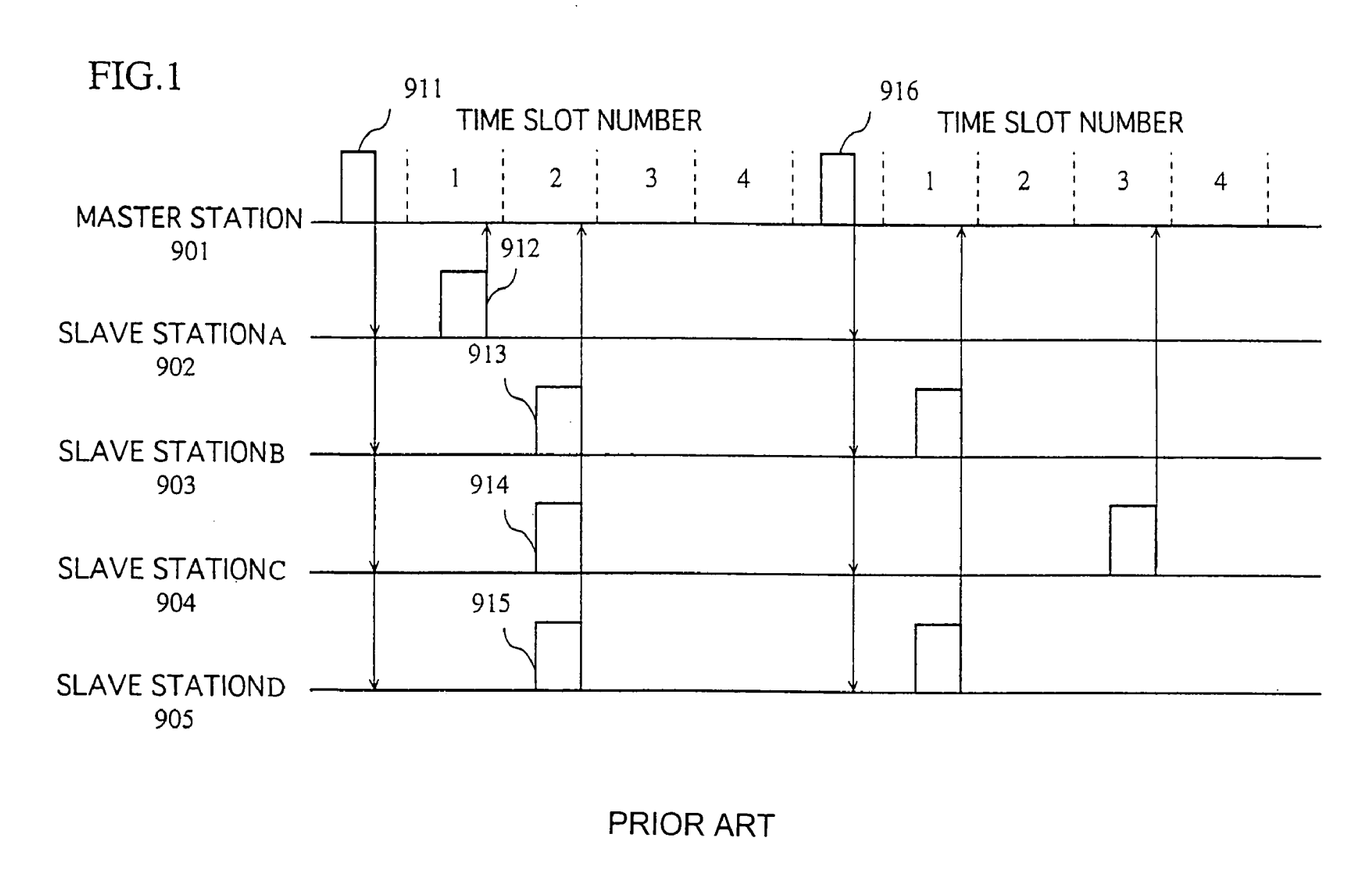
FIG. 1 is a timing chart for explaining a case where a master station conducts information communications with each of a plurality of slave stations in an information communication system using time slots.

The following describes the above-mentioned method using time slots. FIG. 1 is a timing chart for explaining a case where a master station 901 conducts information communications with each of a plurality of slave stations (in this example, a slave station A 902, a slave station B 903, a slave station C 904, and a slave station D 905).

When receiving the first ID request signal 911 transmitted from the master station 901, each slave station transmits an ID response signal with timing corresponding to a time slot number which is determined by the slave station at random. In the illustrated example, the slave station A 902 selects a time slot with the slot number 1 and transmits an ID response signal 912 with timing corresponding to the selected time slot number 1. The remaining slave stations B 903 to D 905 select a time slot with the slot number 2 and transmit their ID response signals with timing corresponding to the selected time slot number 2.

In this case, the slave station 901 can recognize the ID response signal 912 transmitted from the slave station A 902, because only the ID response signal 912 is transmitted during the time slot 1 without overlapping. However, the master station 901 cannot recognize any of the ID response signals 913, 914, and 915 that are transmitted during the time slot 2 since they overlap with one another. As a result of this, the master station 901 needs to transmit an ID request signal 916 for the second time to each of the slave stations B 903 to D 905 to acquire the IDs.

Upon receiving the second ID request signal 916, each slave station transmits the ID response signal for the second time with timing corresponding to the time slot number selected at random. Note that the second ID request signal 916 is attached with information indicating that the slave station A 902 need not transmit the ID response signal to the second ID request signal 916, because the master station has already acquired the ID of the slave station A 902. In this way, by retransmitting the ID request signal, the master station 901 can finally acquire the IDs of all the slave stations.

As another method for avoiding response signals transmitted from slave stations from overlapping with one another, the number of time slots may be increased. For example, if ten time slots instead of four shown in FIG. 1 are provided, a probability that a plurality of slave stations select the same time slot will be decreased.

However, both methods (i.e., the method of allowing the master station 901 to repeat transmitting the ID request signal and the method of increasing the time slot numbers) have a problem that the whole processing time tends to be increased. For instance, in the case where IC cards are used as commuter tickets conducting information communication with a reader/writer set up in a ticket gate, all processes including a process for writing data into each slave station have to be completed in a predetermined time period during which the slave stations are in an area in which they can communicate with the master station (hereinafter, this area is referred to as "service area"). In these circumstances, increase in the processing time may cause a problem that the whole process does not complete in the predetermined time period. This is a serious problem from a practical point of view.

In view of the above-described problems, it is an object of the present invention to provide an information communication system that can reduce the whole processing time in the information communications conducted between a master station and a plurality of slave stations, a contactless IC card used as a slave station in the information communication system, and an IC chip.

DISCLOSURE OF THE INVENTION

An information communication system including a master station and a plurality of slave stations which perform contactless communication with the master station, wherein each slave station comprises: reception means for receiving a signal from the master station; transmission means for transmitting a response signal in response to the signal from the master station; time slot determining means for determining a time slot used to transmit the response signal; and time delay determining means for determining a delayed time for transmitting the response signal within the determined time slot.

This construction increases the possibility that transmission starting timing of response signals are different from one slave station to another, even when the plurality of slave stations select the same time slot. With this, the possibility that, by a certain operation done by the master station or each slave station, the master station can normally recognize at least one response signal form a slave station increases. This also reduces the whole processing time.

In the above information communication system, each slave station may further comprises: detecting means for detecting a transmission of a response signal by another slave station having been performed prior to the determined delayed time within the same time slot; and response signal transmission control means for controlling not to transmit the response signal if the detecting means detects the transmission of the response signal.

With this construction, even in the case where overlap among response signals transmitted from the plurality of slave stations would occur, each slave station can be controlled so as not to transmit its response signal, whereby such overlap can be avoided.

BEST MODE FOR CARRYING OUT THE INVENTION

The following describes an embodiment of the invention, with reference to the attached figures.

Figure 2:
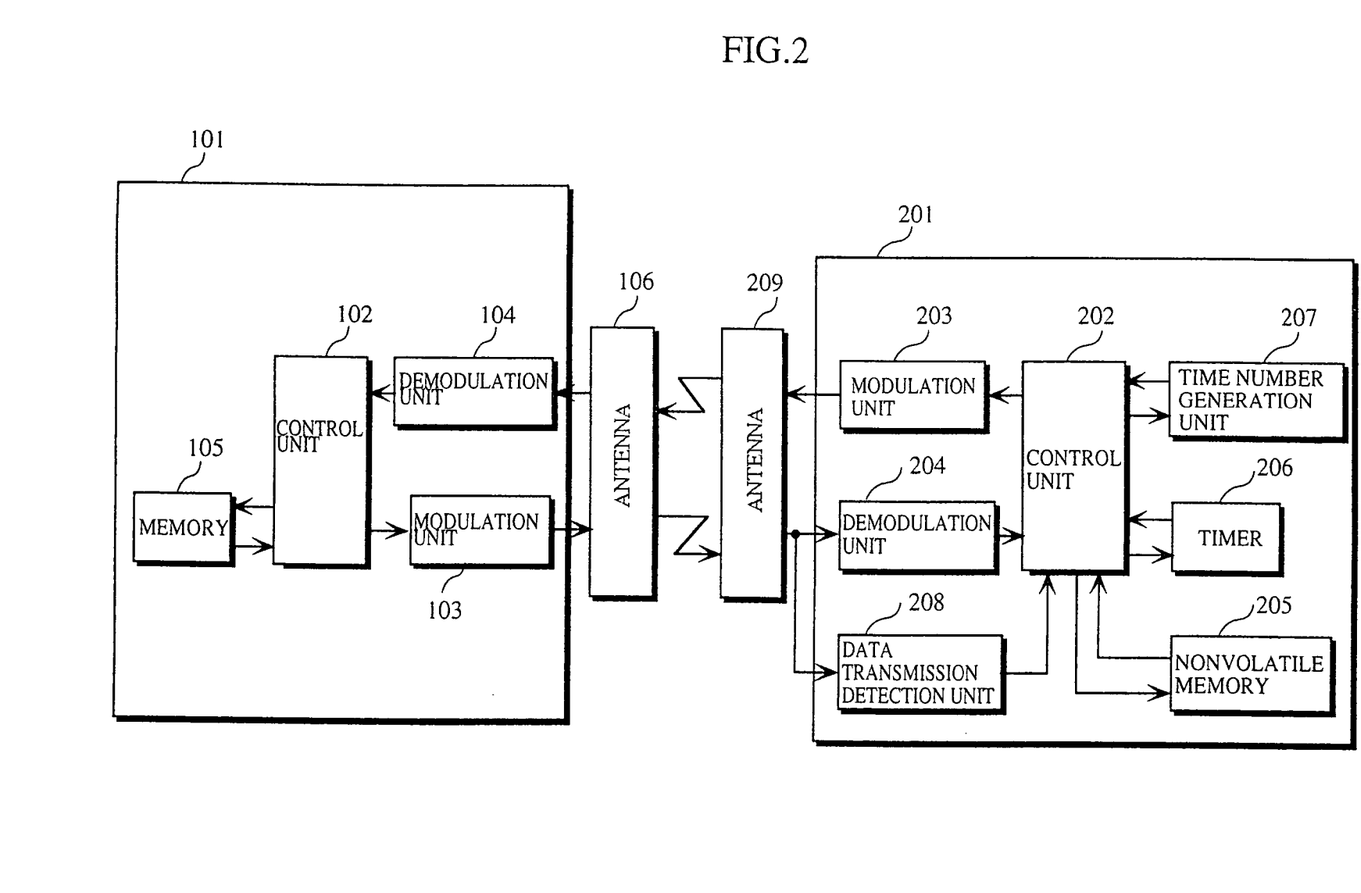
FIG. 2 is a schematic block diagram showing the construction of the master station 101 and the slave station 201 in the information communication system of the present invention.

FIG. 2 is a schematic block diagram showing the construction of the master station 101 (reader/writer) and the slave station 201 (contactless IC card) in the information communication system of the present invention.

The master station 101 includes a control unit 102, a modulation unit 103, a demodulation unit 104, a memory 105, and an antenna 106. The slave station 201 includes a control unit 202, a modulation unit 203, a demodulation unit 204, a nonvolatile memory 205, a timer 206, a time number generation unit 207, a data transmission detection unit 208, and an antenna 209.

Information is transmitted/received between the master station 101 and the slave station 201 by means of their respective antennas 106 and 209, by the electromagnetic induction method or the like. The master station 101 allows the memory 105 and the control unit 102 to generate a request signal, allows the modulation unit 103 to modulate the generated request signal by the Amplitude Shift Keying (ASK) modulation or the like, and transmits the modulated request signal to the slave station 201 via the antenna 106.

The contactless IC card as the slave station 201 in this embodiment does not contain a battery, and uses as the power source the electromotive force that is generated across the antenna 209 when the antenna receives a radio wave from the master station. The present invention can be applied to contactless IC cards complying with the ISO14443 or ISO15693 standard, but is not limited to them.

The demodulation unit 104 demodulates the modulated wave received from the slave station via the antenna 106 and passes the demodulated signal to the control unit 102. The control unit 102 performs necessary processes based on the information transmitted from the slave station 201.

The demodulation unit 204 in the slave station demodulates the modulated wave received from the master station 101 via the antenna 209 and passes the demodulated signal to the control unit 202. The control unit 202 includes a logic circuit as a main component. This control unit 202 performs various processes including a process for writing/reading data on/from the nonvolatile memory 205, based on commands and data transmitted from the master station 101, and generates a response signal to the master station 101. The generated response signal is modulated by the modulation unit 203 by the BPSK modulation method or the like and transmitted to the master station 101 via the antenna 209.

Figure 3:
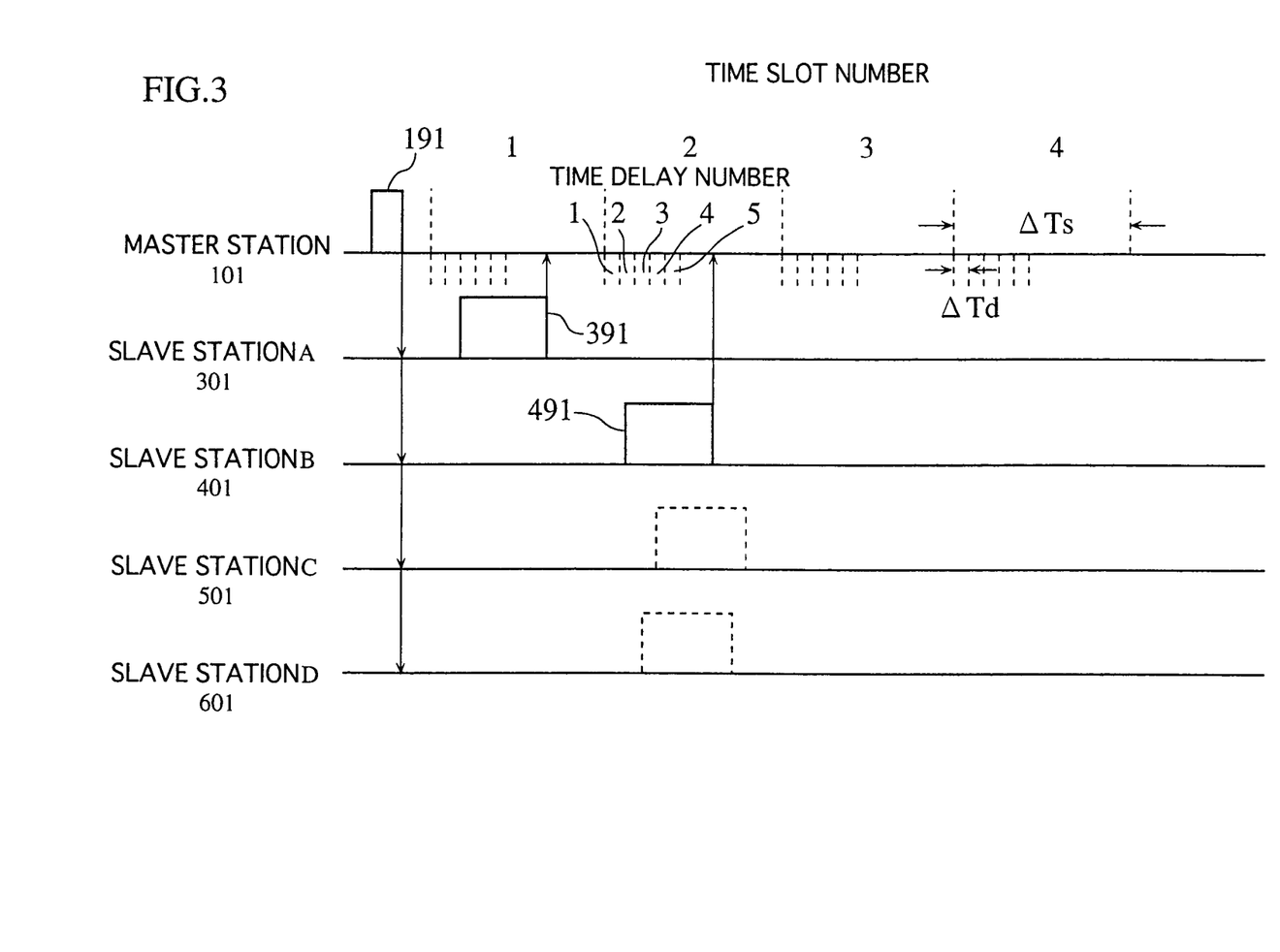
FIG. 3 is a timing chart for explaining time delays.

The time number generation unit 207 allows the control unit 202 to generate time slot numbers and time delay numbers which are used in transmitting the ID of the slave station 201 in response to the ID request signal from the master station 101. The following describes time delays. FIG. 3 is a timing chart for explaining the time delays.

As shown in this figure, in addition to four time slots, this embodiment provides time delays in each time slot. With this construction, the timing with which the ID response signal is transmitted from the slave station 201 to the master station 101 is delayed based on the time delay number determined by the time number generation unit 207 of the slave station 201. The delayed times are obtained by repetitively delaying the ID response signal transmission start timing of the slave station 201 by a certain time period. The delayed times are assigned with numbers called time delay numbers.

In the example shown in FIG. 3, it is assumed that the time number generation unit 207 in the slave station B 401 generates a number "2" for both the time slot number and time delay number. Then, after receiving the ID request signal 191 from the master station 101, the slave station B 401 waits until the time slot 2, further waits and transmits the ID response signal 491 with the timing of the time delay 2. In the present example, it is also assumed that the slave station C 501 generates "2" and "4" for the time slot number and time delay number, respectively, and the slave station D 601 generates "2" and "3", respectively. FIG. 3 shows that the slave stations C 501 and D 601 do not transmit response signals in the time slot 2 since the slave station B 401 has already transmitted the ID response signal at the time delay 2 in the time slot 2.

As described above, the present embodiment at least prevents the case where the master station cannot acquire an ID from any of a plurality of slave stations using the same time slot, by allowing the plurality of slave stations using the same time slot to transmit ID response signals with different timing and exercising a control so that when one of the plurality of slave stations detects that another one of them has already transmitted an ID response signal, the slave station refrains from transmitting an ID response signal. In the above example, the slave stations C 501 and D 601 do not transmit the ID response signals since the data transmission detection units 208 of the slave stations C 501 and D 601 detect transmission of the ID response signal by the slave station B 401.

In the above-described example, only the slave station B 401 transmits an ID response signal in the second time slot, assuring that the master station 101 acquires the ID of the slave station B 401. Note here that time duration $\Delta Td$ between each delayed time is set to such a time duration as is enough for the data transmission detection unit 208 to detect that another slave station has transmitted an ID response signal. The time duration $\Delta Td$ is represented by the following formula:

$$\Delta Ts > (\text{packet transmission time period}) + \Delta Td \times N,$$

where $\Delta Ts$ represents a time period of one time slot, and N the number of delayed times. Thus, compared with the method of increasing the number of time slots, the present method of using the delayed times reduces the system processing time.

Figure 4:
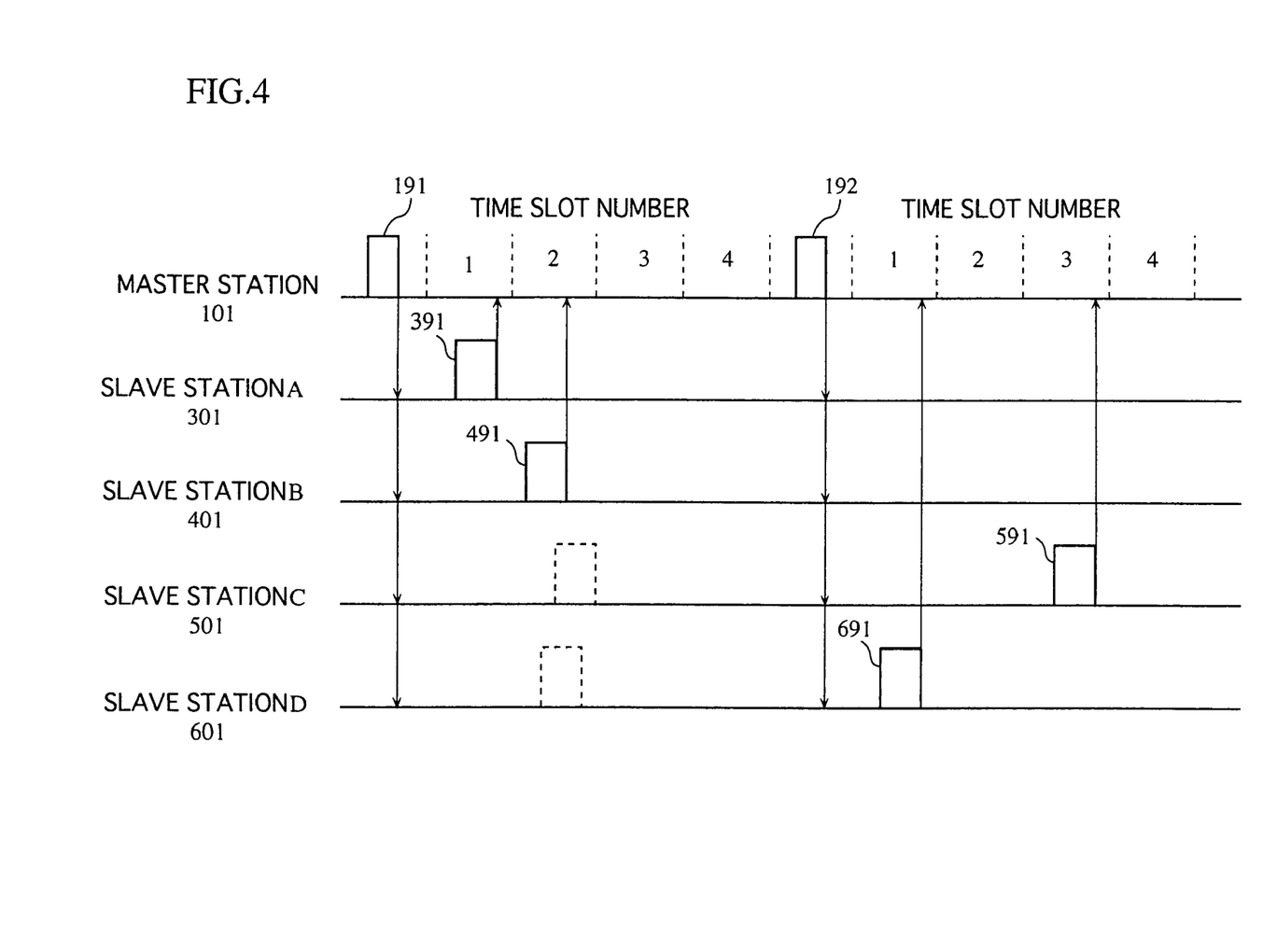
FIG. 4 is a timing chart for explaining communication between the master station and the plurality of slave stations in an embodiment of the present invention.

The master station 101 receives, as a response to the first ID request signal 191, the ID response signal 391 from the slave station A 301 and the ID response signal 491 from the slave station B 401 and acquires IDs of these slave stations. The slave station B 401 no longer needs to transmit an ID response signal in response to the second ID request signal 192 (See FIG. 4). Compared with the case where delayed times are not used (when the slave station B 401 needs to transmit an ID response signal in response to the second ID request signal 192 since the master station cannot acquire its ID with the first ID request signal), a probability of occurrence of the overlapping of response signals from slave stations is reduced. This leads to the reduction in the number of times the master station 101 transmits the ID request signal to the slave stations. This also contributes to the reduction in the processing time of the whole system.

As described above, the slave stations having transmitted an ID response signal in response to the first ID request signal do not transmit the ID response signal in response to the second ID request signal. Accordingly, no slave station transmits an ID response signal in response to the third ID request signal that is not illustrated in FIG. 4. This allows the master station 101 to detect that all IDs of the slave stations currently in the service area have been acquired. This enables the master station to separately transmit or receive information to/from the slave stations by adding the IDs to signals.

Figure 5:
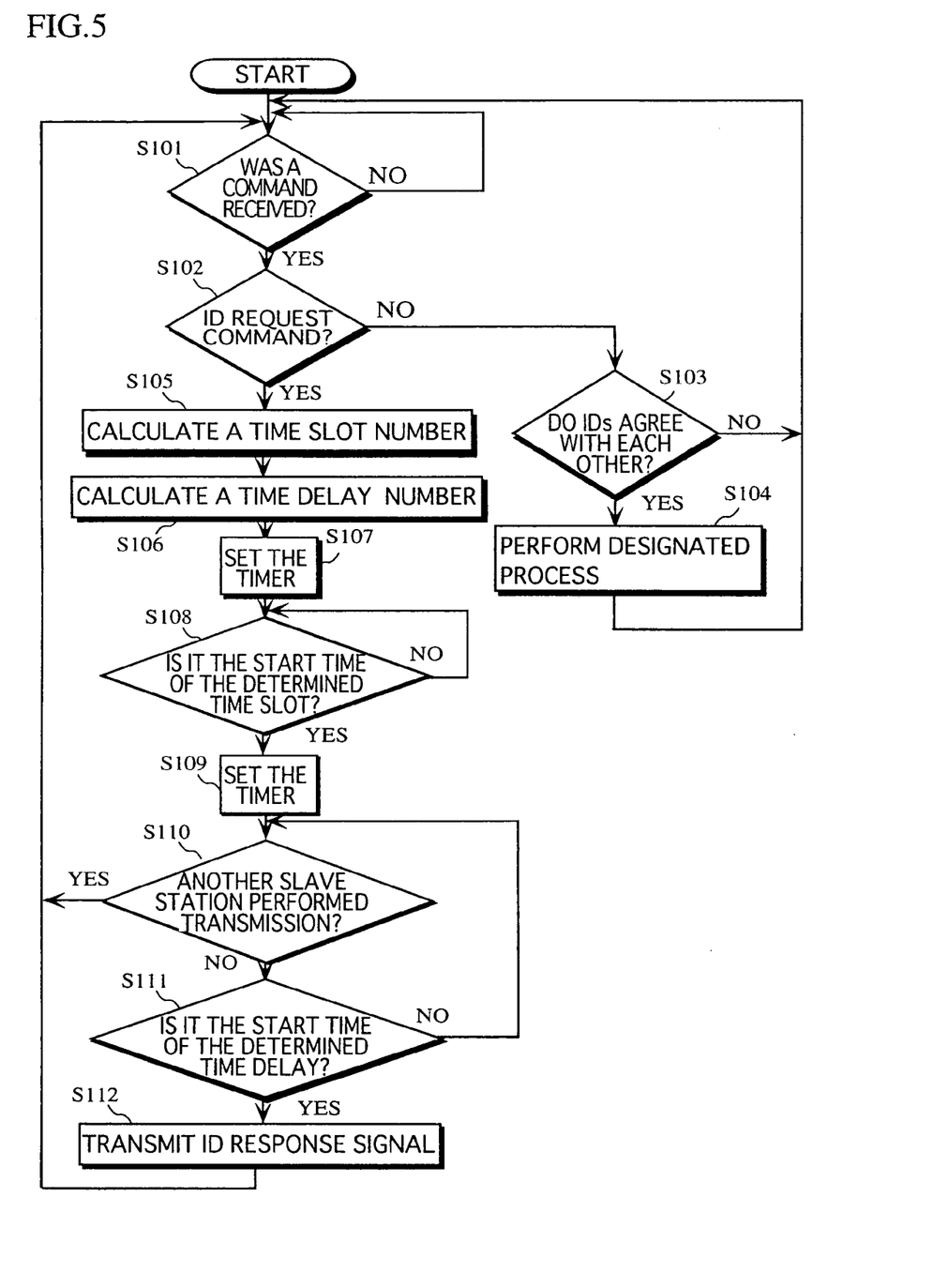
FIG. 5 is a flow chart showing the procedures performed by the control unit 202 of a slave station.

It should be noted here that the adjustment of the transmission start timing in each slave station is performed using the timer 206. Now, the operation of the control unit 202 of each slave station in transmitting an ID response signal will be described in detail. FIG. 5 is a flow chart showing the procedures by the control unit 202 of the slave station 201.

When the slave station 201 enters the service area, the slave station 201 powers up under the influence of electric waves from the master station 101, and the procedure shown in FIG. 5 starts. The control unit 202 in the slave station 201 awaits a command from the master station 101 (S101). When receiving a command (S101: Yes), the control unit 202 judges whether the command is an ID request command or not (S102).

If the received command is not an ID request command (S102: No), the control unit 202 judges whether the ID expected to be attached to the command agrees with an ID held by the slave station 201 (S103). If they do not agree with each other (S103: No), it is judged that the received command is intended for another slave station, then the control returns to the command wait state without performing any process.

If the IDs agree with each other (S103: Yes), the control unit 202 performs the process designated by the command (S104). The procedure explained so far enables the master station to separately handle processes requested by a plurality of slave stations in the service area.

If the received command is an ID request command (S102: Yes), the time number generation unit 207 generates a time slot number (S105) and a time delay number (S106).

Figure 6:
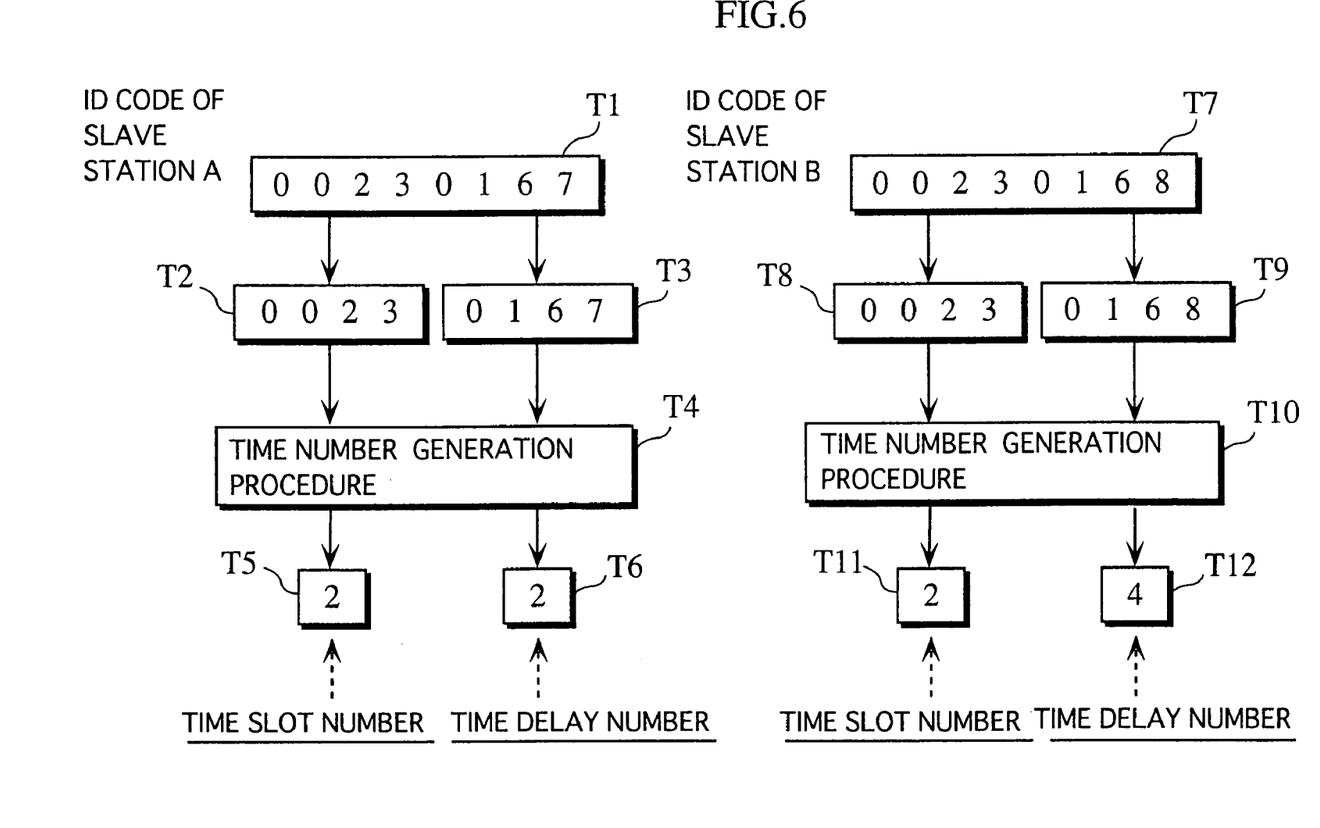
FIG. 6 shows a method for generating time slot numbers and time delay numbers.

Here, how time slot numbers and time delay numbers (hereafter, in generalization, they are referred to as time numbers) are generated will be described. FIG. 6 shows the method for generating the time numbers.

In the present embodiment, each slave station generates the time numbers using the ID of each slave station. The main reason for this is that the use of the ID, which is uniquely assigned, is considered to be the preferable way to prevent a plurality of slave stations from generating the same time number so as to prevent the occurrence of overlapping response signals from the slave stations.

As shown in FIG. 6, IDs T1 "00230167" and T7 "00230168" are assigned to the slave stations A 301 and B 401, respectively. In this embodiment, time slot numbers are generated using upper four digits, that is "0023" (T2 and T8) of the IDs T1 and T7, for both slave station A 301 and B 401. While, time delay numbers are generated using lower four digits of IDs, that is "0167" (T3) for the slave station A 301 and "0168" (T9) for the slave station B 401.

In the succeeding time number generation processes (T4 and T10), time slot numbers (T5 and T11) and time delay numbers (T6 and T12) are generated, respectively. In the time number generation processes T4 and T10, the same time slot number "2" (T5 and T11) is generated since the upper four digits of the two IDs are both "0023", but the probability that the same time delay number is generated is very low since the two IDs have different sets of lower four digits. In this example, different time delay numbers are generated ("2" for slave station A 301, represented as T6, and "4" for slave station B 401, represented as T12). Accordingly, the probability that the same time slot number and the same time delay number are generated is very low. As a result, even if the same time slot number is generated, it is highly possible that different time delay numbers are generated. This prevents the occurrence of overlapping ID response signals transmitted from a plurality of slave stations.

It should be noted here that the method for generating time numbers is not limited to the above-described one including the use of slave station IDs. A variety of methods can be applicable. However, there is a possibility that a plurality of slave stations generate the same time number in response to the first ID request signal. So, it is preferable that each slave station generates, in response to the second ID request signal and onwards, a time number different from the previously generated one. For example, the following methods are applicable: (a) a method of using a random number generation circuit provided in the time number generation unit 207; and (b) a combination of a method of generating a time number by assigning a different weight to each bit and a method of shifting bits of an input ID.

Now, back to the flowchart shown in FIG. 5, after the time slot number and time delay number are generated in steps S105 and S106, the transmission timing of the ID response signal is controlled based on the generated time numbers. The value corresponding to the generated time slot number is set in the timer 206 (S107), and the control unit 202 waits until the time reaches the start time of the determined time slot (S108).

When the time reaches the start time of the determined time slot (S108: Yes), the value corresponding to the generated time delay number is set in the timer 206 (S109). Then, if the data transmission detection unit 208 detects that another slave station has transmitted an ID response signal (S110: Yes), the control unit 202 returns to the command wait state without performing a process.

Figure 7:
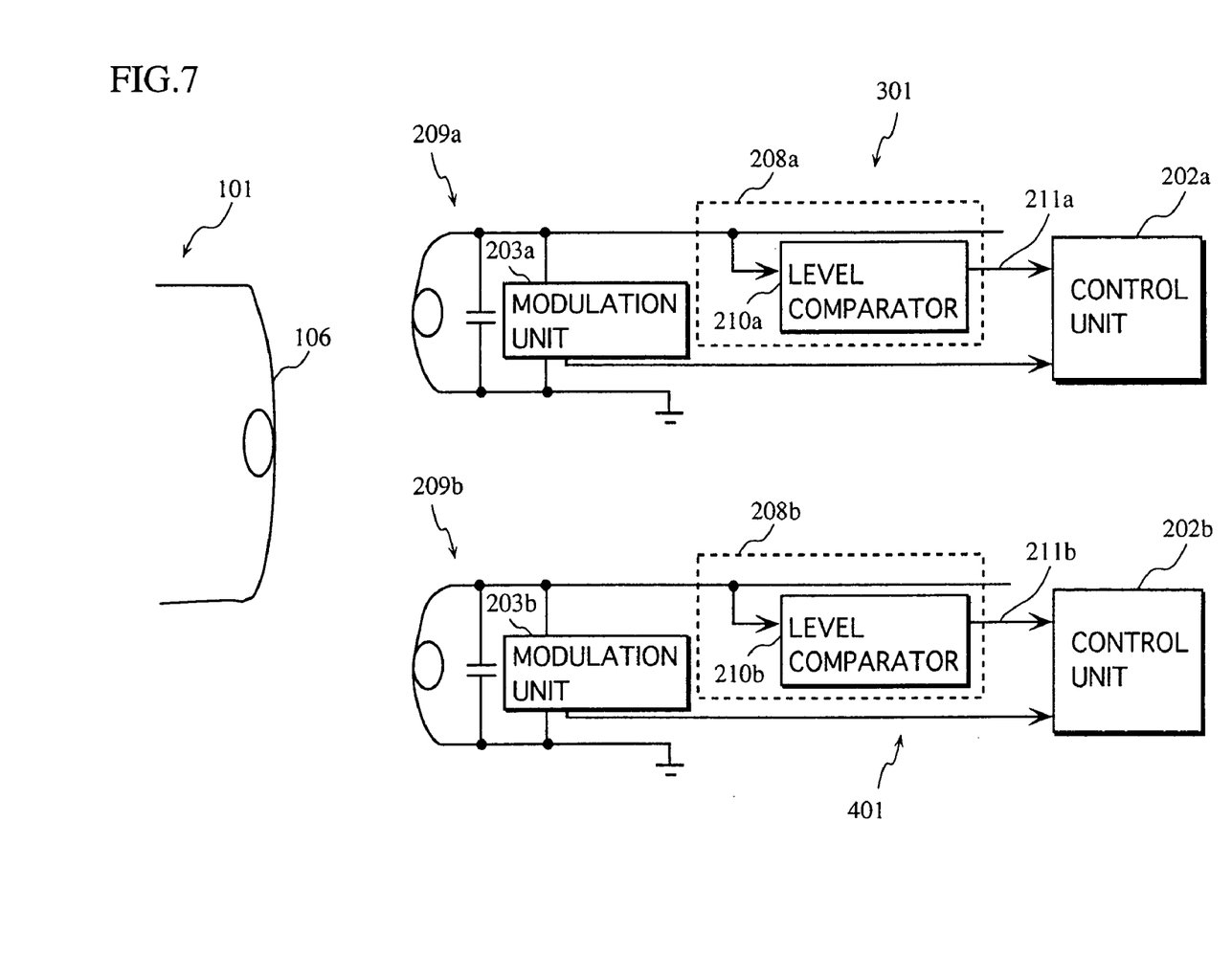
FIG. 7 shows the construction of the data transmission detection unit 208.

If the data transmission detection unit 208 does not detect transmission of a response signal from another slave station (S110: No) and judges that the time has reached the start time of the determined delayed time (S111: Yes), the control unit 202 transmits an ID response signal containing the ID of the slave station 201 (S112). The control returns to the command wait state. In this way, the overlapping of a plurality of response signals from slave stations is prevented by allowing each slave station to check whether another slave station has transmitted an ID response signal in the same slot, and if it detects the transmission, return to the command wait state without transmitting an ID response signal. Now, the detailed construction of the data transmission detection unit 208 will be given. FIG. 7 shows the detailed construction of the data transmission detection unit 208. This figure also shows portions of the master station 101 including the antenna 106, and the slave stations A 301 and B 401.

The slave station A 301 transmits a signal to the master station 101 by inputting a modulated response signal into a transistor (not illustrated) provided in the modulation unit 203a whose source and drain are respectively connected to the ends of the antenna 209a, allowing a load fluctuation to be generated. Similarly, the slave station B 401 transmits a signal by inputting a modulated response signal in to a transistor provided in the modulation unit 203b.

When the slave station A301 has transmitted an ID response signal, the slave station B 401 detects a signal fluctuation that is input to the level comparator 210b via a signal line. Then, the level comparator 210b judges whether the detected signal fluctuation is a small signal fluctuation due to noise or the like, or a relatively large fluctuation due to transmission of the ID response signal by another slave station. The detection result is transmitted to the control unit 202b as a data transmission detection signal 211b.

In this example, since the slave station A 301 has transmitted a response signal to the master station 101, the level comparator 210b in the slave station B 401 judges that the detected fluctuation is a relatively large fluctuation due to transmission of the response signal by another slave station. The detection result transmitted to the control unit 202b prevents the slave station B 401 from transmitting a response signal to the master station.

On the other hand, even if it detects a magnetic fluctuation while transmitting a response signal, the control unit 202 can recognize that it does not indicate a response signal transmission by another slave station since the control unit 202 knows the slave station A 301 is transmitting a response signal. In this way, when a slave station transmits a response signal, the other slave stations can detect it and do not transmit a response signal.

Variations

Although the present invention has been explained by way of embodiments, it should be apparent that the present invention is not limited to the above-described embodiments. The following are some of the possible variations.

(1) In the above embodiment, each slave station determines the time delay number when transmitting an ID response signal in response to an ID request signal transmitted by the master station. However, the determination of a time delay number may be done with other timing. For instance, the time delay numbers may be used in the case that the master station requests all of the slave stations to write data on the memory therein. In this case, the master station transmits a command not including IDs of the slave stations, and all of the slave stations transmit their response signal (e.g., a signal showing the result of data writing) using time delay.

(2) In the above-mentioned embodiment, each slave station is controlled so as not to transmit its response signal when the slave station detects that another slave station has transmitted a response signal, whereby overlapping among response signals from a plurality of slave stations can be avoided. However, from the point of view that the master station acquires IDs from the slave station, it is possible that the master station performs a certain operation. That is, the above embodiment deals with the case where communication between the master station and each of the slave stations is conducted at the single frequency band of, for example, 13.56 MHz. Therefore, if the plurality of slave stations transmit their response signals all at once, the master station cannot recognize the ID of each slave station. However, communication at a plurality of frequency bands can eliminate the necessity of detecting the response signals from slave stations, where each slave station has only to determine the time delay number to delay the transmission timing of the response signal.

(3) The above embodiment deals with the case where the number of time slots and time delays are respectively 4 and 5. However, neither time slot numbers nor time delay numbers are limited to these numbers, but they can be freely selected.

(4) The above-mentioned circuit elements in each slave station (i.e., the circuit including the control unit 202, the timer 206, the time number generation unit 207, the data transmission detection unit 208 or the like) may be provided on a single IC chip. Additionally, the IC chip is not limited to the above-mentioned IC card, but can be variously processed for practical applications such as a label attached on the mail and a contactless tag attached to a baggage.

INDUSTRIAL APPLICABILITY

The present invention is applicable to information communication systems having a plurality of slave stations which are, for example, contactless IC cards.

The invention claimed is:

1. An information communication system including a master station and a plurality of slave stations which perform contactless communication with the master station, wherein
each slave station comprises:
reception means for receiving a signal from the master station;
transmission means for transmitting a response signal in response to the signal from the master station;

time slot determining means for determining a time slot used to transmit the response signal;

time delay determining means for determining a delayed time for transmitting the response signal within the determined time slot by selecting one out of a plurality of predetermined transmission delayed times;

detecting means for detecting a transmission of a response signal by another slave station having been performed prior to the determined delayed time within the same time slot; and response signal transmission control means for controlling not to transmit the response signal if the detecting means detects the transmission of the response signal, wherein a time duration $\Delta Td$ between each delayed time is set to such a time duration as is enough for the detecting means to detect that another slave station has transmitted a response signal, and is represented by the following formula:

$$\Delta Ts > (\text{packet transmission time period}) + \Delta Td \times N,$$

where $\Delta Ts$ represents a time period of one time slot, and N the number of delayed times.

2. The information communication system of claim 1, wherein,
the time delay determining means selects one out of the plurality of predetermined transmission delayed times, based on an identifier uniquely assigned to each slave station.

3. The information communication system of claim 1, wherein,
the time delay determining means determines the delayed time when the reception means receives an identifier request signal transmitted from the master station.

4. An information communication system including a master station and a plurality of slave stations which perform contactless communication with the master station, wherein
each slave station comprises:
reception unit for receiving a signal from the master station;
transmission unit for transmitting a response signal in response to the signal from the master station;
time slot determining unit for determining a time slot used to transmit the response signal;
time delay determining unit for determining a delayed time for transmitting the response signal within the determined time slot by selecting one out of a plurality of predetermined transmission delayed times;
detecting unit for detecting a transmission of a response signal by another slave station having been performed prior to the determined delayed time within the same time slot; and
response signal transmission control unit for controlling not to transmit the response signal if the detecting unit detects the transmission of the response signal,
wherein a time duration $\Delta Td$ between each delayed time is set to such a time duration to enable the detecting unit to detect that another slave station has transmitted a response signal, and is represented by the following formula:

$$\Delta Ts > (\text{packet transmission time period}) + \Delta Td \times N,$$

where $\Delta Ts$ represents a time period of one time slot, and N the number of delayed times.

5. The information communication system of claim 4, wherein,
the time delay determining unit selects one out of the plurality of predetermined transmission delayed times, based on an identifier uniquely assigned to each slave station.

6. The information communication system of claim 4, wherein,
the time delay determining unit determines the delayed time when the reception means receives an identifier request signal transmitted from the master station.

7. A contactless IC card which performs contactless communication with a master station, comprising:
reception unit for receiving a signal from the master station;
transmission unit for transmitting a response signal in response to the signal from the master station;
time slot determining unit for determining a time slot used to transmit the response signal;
time delay determining unit for determining a delayed time for transmitting the response signal within the determined time slot by selecting one out of a plurality of predetermined transmission delayed times;
detecting means for detecting a transmission of a response signal by another apparatus having been performed prior to the determined delayed time within the same time slot; and
response signal transmission control means for controlling not to transmit the response signal if the detecting means detects the transmission of the response signal,
wherein a time duration $\Delta Td$ between each delayed time is set to such a time duration as is enough for the detecting unit to detect that another slave station has transmitted a response signal, and is represented by the following formula:

$$\Delta Ts > (\text{packet transmission time period}) + \Delta Td \times N,$$

where $\Delta Ts$ represents a time period of one time slot, and N the number of delayed times.

8. The contactless IC card of claim 7, wherein
the time delay determining unit selects one out of a plurality of predetermined transmission delayed times.

9. The contactless IC card of claim 8, wherein
the time delay determining unit selects one out of the plurality of predetermined transmission delayed times, based on an identifier uniquely assigned to the contactless IC card.

10. The contactless IC card of claim 7, wherein
the time delay determining unit determines the delayed time when the reception unit receives an identifier request signal transmitted from the master station.

* * * * *